(12) United States Patent
Sarkar et al.

(10) Patent No.: US 11,542,212 B2
(45) Date of Patent: Jan. 3, 2023

(54) MICROALGAE ENHANCED BIOLOGICAL CROP NUTRITION GRANULES

(71) Applicant: AlgaEnergy N.A. Inc., Eugene, OR (US)

(72) Inventors: Debabrata Sarkar, Ghaziabad (IN); Ronak Satishchandra Chhaya, Ahmedabad (IN); Lokesh Singh, Hisar (IN); Douglas Ry Wagner, Pleasant Hill, OR (US)

(73) Assignee: AlgaEnergy N.A. Inc., Eugene, OR (US)

( * ) Notice: Subject to any disclaimer, the term of this patent is extended or adjusted under 35 U.S.C. 154(b) by 0 days.

(21) Appl. No.: 16/881,836

(22) Filed: May 22, 2020

(65) Prior Publication Data

US 2021/0363071 A1 Nov. 25, 2021

(51) Int. Cl.
| | | |
|---|---|---|
| C05F 11/08 | (2006.01) | |
| C05G 5/12 | (2020.01) | |
| C05G 5/30 | (2020.01) | |

(52) U.S. Cl.
CPC .............. C05F 11/08 (2013.01); C05G 5/12 (2020.02); C05G 5/30 (2020.02)

(58) Field of Classification Search
None
See application file for complete search history.

(56) References Cited

U.S. PATENT DOCUMENTS

| | | | |
|---|---|---|---|
| 4,551,165 A | 11/1985 | Warner | |
| 10,900,013 B2* | 1/2021 | Krivov | .................. C12M 47/10 |
| 2012/0144887 A1* | 6/2012 | Fiato | ...................... C12M 43/06 |
| | | | 71/7 |
| 2012/0192605 A1* | 8/2012 | McSpadden Gardener | ................. |
| | | | C05G 5/30 |
| | | | 71/7 |
| 2015/0203414 A1 | 7/2015 | Cook | |
| 2016/0200634 A1* | 7/2016 | Zaseybida | ............... C05B 17/00 |
| | | | 71/11 |
| 2017/0197890 A1* | 7/2017 | Jacobson | ............... C05D 1/005 |
| 2018/0237353 A1* | 8/2018 | Yoon | ...................... A01N 63/00 |
| 2018/0258005 A1 | 9/2018 | Benmoussa | |
| 2019/0256431 A1* | 8/2019 | Zaseybida | ............... A23K 20/26 |
| 2020/0148605 A1* | 5/2020 | Burnham | .................. C05F 3/00 |

FOREIGN PATENT DOCUMENTS

CA 2834540 A1 * 5/2015 ............... C05G 5/00

OTHER PUBLICATIONS

International Search Report and Written Opinion dated Aug. 20, 2021 for International Application No. PCT/US2021/033300, 8 pages.

* cited by examiner

*Primary Examiner* — Wayne A Langel
(74) *Attorney, Agent, or Firm* — Cooley LLP

(57) ABSTRACT

A combined microalgae and mycorrhizal fungi granular formulation includes a microalgae inoculant combined with a mycorrhizal fungi inoculant with demineralized water to maintain moisture and applied to carrier granules such as a natural clay-based or mineral-based material. The coated granules are dried and may be applied to agricultural areas in dried granular form.

28 Claims, 1 Drawing Sheet

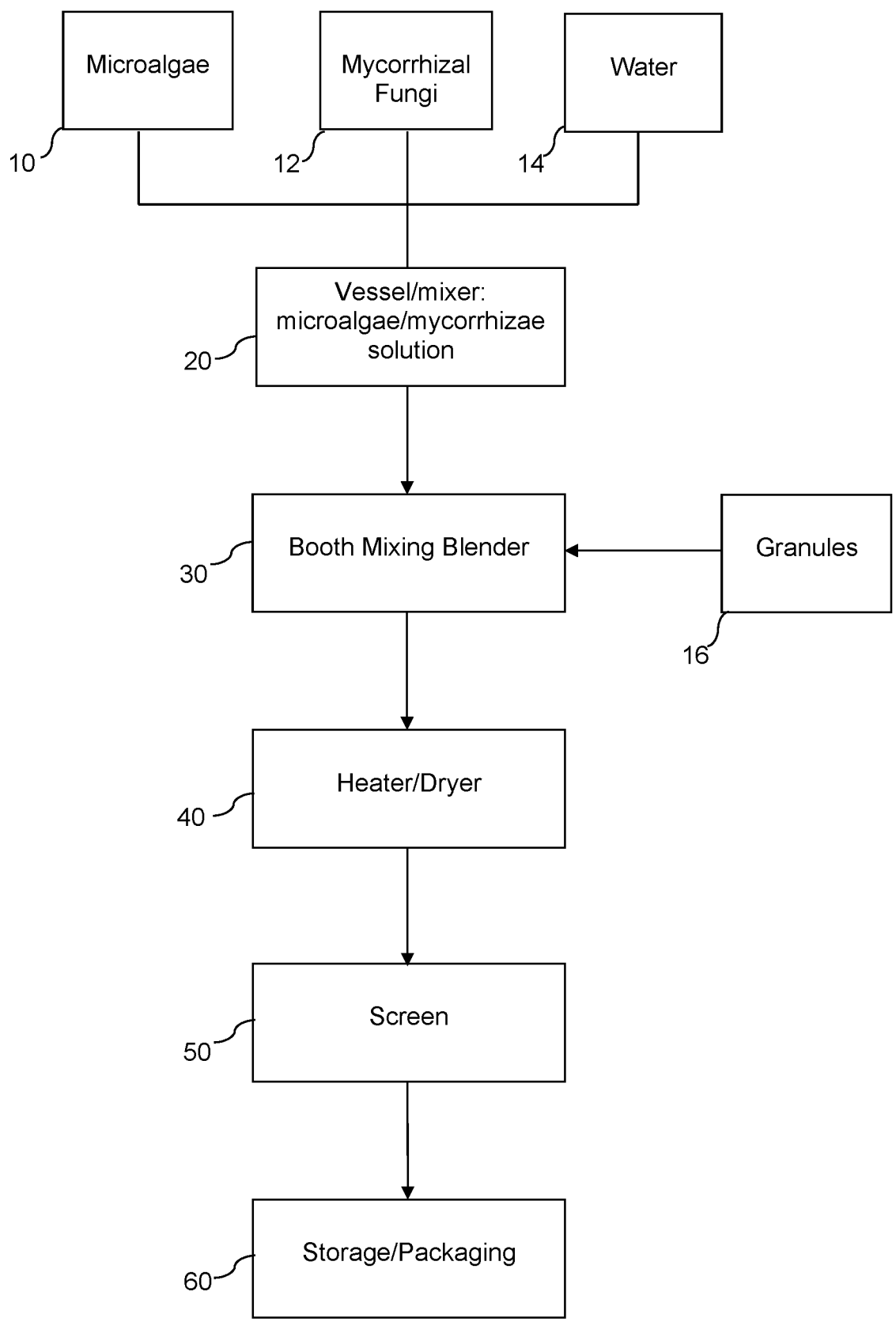

MICROALGAE ENHANCED BIOLOGICAL CROP NUTRITION GRANULES

FIELD OF THE INVENTION

The present invention relates to the formulation and use of microalgae enhanced crop nutrition granules that contain other active biological substances such as mycorrhizae or other microorganisms, and their dormant forms such as spores. The present invention further relates to a process for preparing a homogenous mixture of microalgae liquid extracts and mycorrhizae spores on natural clay based granules as a support carrier material.

BACKGROUND OF THE INVENTION

Today with ever-increasing needs for the production of food crops one of the serious issues of worldwide concern is the ability to produce sufficient volumes and quality of food to meet the demands of increasing populations while at the same time doing so with less land and fewer resources. With the advent of Green Revolution in the 1960s, intensive agricultural practices now include use of high-yielding, disease-resistant crop varieties, and the constant input of agrochemicals such as chemical fertilizers and pesticides. The application of such chemicals can adversely affect the dynamic equilibrium of the soil and environment and affects agricultural biodiversity by destroying non-target useful microorganisms that provide critical nutrition and active natural compounds to promote crop growth and development.

Algae are ubiquitous in almost all terrestrial and aquatic environments, and are one of the most characteristic organisms on the Earth with potential applications in human and animal nutrition food ingredients, in agriculture as biofertilizers and amelioration of sodic soils, in waste water treatment, and as source of biofuel. Filamentous, heterocystous, nitrogen fixing, photosynthetic cyanobacteria (BGA) are part of an agriculture field ecosystem assumed as an excellent source of useable nitrogen for crop production in global nitrogen economy and embraced as a better alternative to agrochemicals with significant economic and environmental benefits.

Algal biofertilizers like BGA, such as *Nostoc* sp., *Anabaena* sp., *Tolypothrix* sp., *Aulosira* sp., and others, have the potential to fix atmospheric nitrogen. Better nitrogen fixing ability of BGA under flooded conditions has been determined when compared under dry land conditions, which might be correlated with relatively stable yield of rice under flooded conditions. Key roles played by cyanobacteria include the maintenance and build-up of soil fertility, which further results in increasing rice growth and yield. The contributions of these algae include (1) enhancement of soil porosity by a group of cyanobacteria having filamentous structure and production of adhesive substances; (2) excretion of growth-promoting substances such as plant hormones (e.g., auxin, gibberellin), vitamins, antioxidants and amino acids; (3) increase in water holding capacity through their gelatinous structure; (4) increase in soil biomass following their death and decomposition; (5) decrease in soil salinity; (6) prevention of weed growth; and (7) increase in soil phosphate availability by excretion of organic acids.

A mycorrhiza is a symbiotic association between a fungus and the roots of a vascular plant. In this association, the fungus colonizes the host plant's roots, either intracellularly or extracellularly. Mycorrhizal fungi are commonly divided into "ectomycorrhiza" (the hypha of fungi do not penetrate individual cells with in the root) and "endomycorrhiza" (the hypha of fungi penetrate the cell wall and invaginate the cell membrane). Endomycorrhiza are variable and are further classified as arbuscular, ericoid, arbutoid, monotropoid and orchid mycorhizae. They are an important component of soil life and soil chemistry. Arbuscular mycorrhizal (AM) fungi are ubiquitous in soil habitats and form beneficial symbiosis with the roots of angiosperms and other plants. Of the symbiotic associations of plant and fungi, those involving an association between plants and Glomeromycota fungi has the widest distribution in the nature. Arbuscular mycorrhiza fungi inhabit a variety of ecosystems including agricultural lands, forests, grasslands and many stressed environments, and these fungi colonize the roots of most plants, including bryophytes, pteridophytes, gymnosperms and angiosperms. Arbuscular mycorrhizal fungi belong to the family Endogonaceae, of the order Muccorales, of the class Zygomycetes. The arbuscular mycorrhizal forming genera of the family includes Acaulospora, Entrophospora, Gigaspora, Glomus, Sclerocystis and Scutellospora.

Currently, microalgae is most readily available as an aqueous inoculant in HDPE pouches that must be stored at ambient temperature not directly exposed to sunlight. This application process has proved somewhat successful; however, the product can generally only be applied by drenching or foliar spray and not through solid application such as by broadcasting to the field or paddy. Further, due to the difference in formulation types and liquid types used to apply microalgae and mycorrhizae, these two beneficial products are applied separately and are often applied inconsistently, leading to less than ideal results.

SUMMARY OF THE INVENTION

The present invention is directed to combined microalgae with mycorrhizal fungi granular formulations. In one preferred example, it comprises from about 0.5% to about 5.0% or greater w/w microalgae inoculant, from about 0.5% to 2.0% or greater w/w mycorrhizal fungi inoculant with sufficient quantity of demineralized water to maintain moisture not more than 12%, and from about 80% to about 95% w/w (or more, depending on moisture content) of a natural clay-based or mineral-based granules, or other solid substrate such as extruded pellets of organic composition or granules of mineral or synthetic fertilizer.

In some versions, the process includes coating or spraying spores of at least two or at least three species of mycorrhizal fungi onto carrier granules.

The granular material, in some versions, includes mineral clay or clay mixtures such as dolomite, attapulgite and calcined bentonites.

Preferably, the process of creating the coated granules includes three principal steps: mixing the microalgae and mycorrhizal fungi, coating the granules, and drying the coated granules. Once coated, the covering serves like an armor for spores of the mycorrhizal fungi so that it protects against adverse environmental conditions and confers resistance destruction by handling or other mechanical damage that could otherwise occur in transport, storage, or use. The coating also protects against potentially damaging changes of temperature, dehydration, or other environmental effects.

Other preferred compositions of the invention are directed to granular mixtures comprising microalgae with mycorrhizal fungi granule formulations made of mineral-based, organic-matter based, or mineral or synthetic fertilizer-based compositions, or combinations of these or other materials.

The present invention is further directed to a process for preparing granular mixtures of granule formulations. In one example, it comprises adding one part of the microalgae coating solution to a tank or other vessel and adding one part of the mycorrhizal technical solution to the vessel; adding a sufficient amount of demineralized water to keep final moisture at not more than 12%; applying the solution to a quantity of natural clay based granules for further blending and mixing; and blending for 5 to 20 minutes.

The application of the solution to clay or other granules or pellets may further include spraying the coating solution into a booth mixer or drum granulator through a spraying gun pipe having a nozzle with the size range of at least 2-4 mm, preferably through multiple holes available inside the booth mixture.

The process may also include drying the granules at ambient temperature or optionally under a sodium lamp or other heat source before packing to avoid any moisture formation in the final packed product.

The present invention is further directed to methods of enhancing plant growth by applying a formulation or mixture of the present invention to the plant, plant propagation material, or to any area where the plant will grow.

BRIEF DESCRIPTION OF THE DRAWINGS

FIG. 1 is a flow diagram illustrating a preferred process for preparing a combined microalgae and mycorrhizal fungi granular mixture.

DETAILED DESCRIPTION OF THE PREFERRED EMBODIMENT

A preferred process for preparing a combined microalgae and mycorrhizal fungi granular mixture is described with reference to FIG. 1.

Microalgae/Mycorrhizae Solution. In a first stage, a liquid mixture comprising a combination of microalgae and mycorrhiza is prepared, for subsequent use in coating carrier granules. Most preferably, this stage includes preparing a combined solution containing microalgae (which may be a microalgae extract) 10 and mycorrhizal fungi (which may be, for example, a mycorrhizae spore mixture) 12 by combining demineralized water 14 together with the microalgae and mycorrhizal fungi solutions to a desired concentration level.

Microalgae. In the preferred mixture, the term "microalgae" refers single cell prokaryotic and/or eukaryotic algae, or combinations thereof. In a preferred embodiment, the microalgae is incorporated in the form of an extract having a microalgae concentration of about 3% to 7% free L-amino acids and a concentration of 5% to 10% organic carbon. In one preferred example, a liquid composition is used which contains 11% microalgae extract by volume, with between 6% and 7% total free L-amino acids and between 6% and 7% organic carbon.

The microalgae can comprise any suitable species of microalgae. Preferred species in accordance with the invention include *Chlorella, Scenedesmus, Arthrospira Nannoch/oropsis, Muriel/apsis, Isochrysis* and T-1S0, *Anabaena, Desmodesmus,* and *Haematococcus.* Yet other species of microalgae may also be used, preferably to the extent that they provide a desired biomass or other composition. In some examples, the microalgae comprise two or more different species of microalgae in combination.

Microalgae can be produced in a variety of conditions, such as heterotrophic, mixotrophic, or phototrophic, in order to produce microalgae having correspondingly varying qualities. Likewise, various species of microalgae can be processed in several ways, such as in the production of a liquid composition using whole cells, reducing it to an extract, or drying. Such processes may extract or isolate proteins or other components of the microalgae. As used in this description, the term "microalgae" encompasses any form of microalgae, whether in a natural and unprocessed whole state, dried, extracted, or otherwise processed.

In one preferred version, a microalgae extract is used in the liquid composition. In general, microalgae are cultivated such as in a bioreactor system, then harvested and converted to powder form such as by drying, grinding, and sieving. The resulting powder microalgae biomass can then be combined with water to produce a microalgae extract of a desired composition and concentration such as described above. In accordance with further preferred aspects, the acidity of the microalgae extract is adjusted to a desired range for ideal effectiveness and subsequent compatibility with mycorrhiza. In one version, the acidity of the microalgae solution initially is in a range of between pH 3 to 5, or more preferably pH 3.6 to 4.2, or more preferably pH 3.8 to 3.9. In one example, the microalgae solution is combined with demineralized water and a buffer such as 0.1 M Citrate buffer intended to produce the microalgae solution at a pH level in the range of 6.0 to 6.5. As necessary, an amount of NaOH or HCl (or other acids or bases) are added to the microalgae solution for the purpose of adjusting the pH level of the microalgae solution to the final desired level in the range of 6.0 to 6.5.

Mycorrhiza. As noted previously, mycorrhiza are commonly divided into "ectomycorrhiza" (the hypha of fungi do not penetrate individual cells within the root) and "endomycorrhiza" (the hypha of fungi penetrate the cell wall and invaginate the cell membrane). In some versions of the invention, only endomycorrhiza are used in the coating mixture while in other versions a combination of ectomycorrhiza and endomycorrhiza is used. In a preferred form, a mycorrhiza mixture is used in which the mixture contains at least 95 percent, or at least 97 percent endomycorrhiza content and the balance to achieve 100 percent is comprised of ectomycorrhiza content.

In preferred versions, the endomycorrhiza content comprises any one of the following species of endomycorrhizal fungi: *Rhizophagus* Sp., *Glomus* Sp., *Acaulospora* Sp., *Scutellospora* Sp. and *Glomus* Sp. The endomycorrhiza content may alternatively comprise a mixture of the foregoing endomycorrhizal fungi. Combinations of the foregoing endomycorrhiza can thus be created to produce desired results in plant growth. *Rhizophagus* Sp. are able to penetrate the cells of the root to form tree-like structures (arbuscular) for the exchange of sugars and nutrients with the host plant and are highly efficient in nutrient-deficient soil. *Glomus* Sp. obtain carbon from the host plant in exchange for nutrients and other benefits, help in soil detoxification processes (for example, detoxifying arsenic-laced soils). They also improve soil nodulation and nutrient uptake to the plant, increase the surface area for absorption of water, phosphorus, amino acids, and nitrogen, and are more resistant to certain soil-borne diseases. *Acaulospora* Sp. are able to interact with and change the environment in the favor of the host plants, improving soil structure and quality. *Scutellospora* Sp. create humic compounds, polysaccharides, and glycoproteins that bind soils, increase soil porosity, and promote aeration and water movement into the soil. Alternatively, yet other versions of endomycorrhizal fungi may be used.

In a preferred version, the ectomycorrhiza content comprises *Pisolithus* Sp., or others. Such ectomycorrhiza are efficient in uptake of inorganic and organic nutrient resources, and enhance the capability to utilize organic nitrogen sources efficiently. They further create structures that host nitrogen-fixing bacteria that contribute to the amount of nitrogen taken up by plants in nutrient-poor environments. They are also highly nickel-tolerant, and work efficiently in ultramafic soil.

Preferably, the mycorrhiza has a concentration of about 1,000 to 10,000 infective spores per gram with a preferred concentration of greater than 5,000 spores per gram. In preferred versions, an exemplary combination comprises 600,000 infectivity propagules per 100 grams endomycorrhiza, and a minimum 50,000 propagules per 100 gram ectomycorrhiza. More preferably, the mycorrhiza has a maximum concentration combination of 100,000, and a minimum or 8,000 infectivity propagules per 100 grams endomycorrhiza.

As noted above, microalgae liquid may have a pH level of up to 3.8 pH, thus limiting potential mixture formulation with mycorrhizae, which may commonly have a pH level of 8.0 to 9.0 in liquid form. If combined with a microalgae solution under such low pH (that is, 3.8), the acidity may cause the mycorrhiza to deteriorate and lose viability in liquid. The preferred versions of the invention therefore separately produce liquid solutions for each at a similar pH level, then combine both microalgae extract and mycorrhizae spores with a carrier with similar physical and chemical properties.

In one preferred version, a mycorrhiza solution is prepared separately from the microalgae solution for subsequent combination with the microalgae solution. In order to best combine the two solutions without damaging the mycorrhiza, each is prepared to the same or substantially equivalent pH level, preferably in the range of 6.0 to 6.5 as described above for the microalgae solution. In one version, the mycorrhiza solution is combined with demineralized water and a buffer such as 0.1 M Phosphate buffer intended to produce the mycorrhiza solution at a pH level in the range of 6.0 to 6.5. As necessary, an amount of NaOH or HCl (or other acids or bases) are added to the mycorrhiza solution for the purpose of adjusting the pH level of the mycorrhiza solution to the final desired level in the range of 6.0 to 6.5.

Microalgae/Mycorrhiza mixtures. In one version, the preferred combined coating solution comprises a microalgae concentration which is approximately equal to the mycorrhiza concentration in the combined solution, on a weight to weight basis. Thus, in one version, the microalgae comprises from about 2.0% to about 5.0%, and more preferably about 2.7% on a w/w basis, and the mycorrhiza comprises about 1.0% to 3.0%, and more preferably about 2.0% w/w. The combined coating solution is further combined with demineralized water sufficient to facilitate spraying and a desired concentration in the final product. In other versions, the relative amounts of microalgae and mycorrhiza in the combined coating solution may be varied. Once combined, the pH of the mixture with both microalgae and mycorrhiza is again adjusted if necessary to maintain the desired range of pH 6.0 to 6.5, preferably using NaOH or HCL.

The combined coating solution may be mixed using a mixing stirrer in an appropriate vessel 20. In one version, the ingredients are mixed for between five and twenty minutes, preferably using either stirring or agitation.

After mixing, the final coating solution is transferred by pump or other means to a chamber in communication with one or more spray nozzles to allow it to be sprayed onto the carrier granules or other desired substrate.

Substrate or carrier. The carrier granules 16 are prepared as a substrate or carrier for the combined solution. As indicated in FIG. 1, the granules may be prepared prior to the mixture of the solution, or simultaneous with or after the solution preparation. As noted above, the carrier may be natural clay granules or mineral- or organic-based granules (such as limestone, silica, talc, kaolin, dolomite, calcium sulfate or calcium carbonate, magnesium sulfate or magnesium carbonate or magnesium oxide, diatomaceous earth, zeolites, trehalose, chitosan, or shellac), or other solid substrates formed as granules or extruded pellets of other materials such as synthetic fertilizer. Yet other materials may be used. Preferably the granules are from about 800 to about 1700 microns in diameter natural clay.

Natural clay based granules are inert, biodegradable, resistant to attrition due to mixing, and have a neutral pH. Accordingly, the acidity of the combined solution is essentially natched to that of the carrier. Clay granules are available in several size grades from 12/25 mesh to 10/20 & 16/35 mesh (ASTM). A range of carrier sizes are suitable for use with preferred versions of the invention.

In an alternate version, the granules may be formed from zeolite or dolomite. Zeolite and dolomite are used as soil conditioners in which zeolite can control and raise the pH of the soil and soil moisture, while dolomite is used for soil neutralization to correct acidity. Adding zeolite or dolomite to manure will improve the nitrification process. These materials are commonly used as slow release substances for pesticides, herbicides and fungicides. In versions of the invention, zeolite or dolomite particles, or combinations of the two, may be used for the carrier granules.

In another version, attapulgite may be used as carrier granules. Attapulgite is a magnesium aluminum phyllosilicate which occurs in a type of clay soil, and it is used as a processing aid and functions as a natural bleaching clay for the purification of vegetable and animal oils. Its available in both colloidal and non-colloidal forms. In some versions of the present invention, attapulgite particles or granules are used as carrier granules in the present invention.

Leonardite is an oxidation product of lignite coal, mined from near surface pits. Leonardite is a high quality humic material soil conditioner which acts as a natural chelator. It is typically soft, dark colored, and vitreous, containing high concentrations of the active humic acid and fulvic acid. In some versions of the invention, leonardite may be used, alone or combined with other materials, as a carrier granule.

Bentonite pellets are used in agriculture for soil improvement, livestock feed additives, pesticide carriers, and other purposes. Bentonite mixed with chemical fertilizer can fix ammonia and can act a role of buffer for fertilizer. The inherent characteristics of water retention and absorbency makes it an ideal addition to improve the fertility of soil. The prevalence of sandy soil in many regions that suffer from low water and nutrient holding characteristics, can be significantly enhanced by the addition and blending of calcined bentonite. In some versions of the invention, bentonite, or calcined bentonite, is used as a carrier granule.

In yet other versions of the invention, the carrier granules may comprise a mix of different materials such as clay, leonardite, attapulgite, and/or bentonite.

Coating application. The granules are preferably added to the booth mixing blender 30 (or another vessel suitable for facilitating coating) just before, simultaneous to, or just after spraying of the coating solution begins. A vibrating mesh screen may be used to control granule size as noted above, and preferably the mesh filtering occurs prior to transferring the granules to the booth mixing blender.

The coating solution in vessel 20 is sprayed through a spraying gun pipe preferably having nozzles with the size range of at least two to four mm, through multiple holes available inside the booth mixing blender 30.

The granules are blended in the booth mixing blender 30 for five to twenty minutes. Blending may be, for example, in the form of tumbling or other agitation.

Drying. The granules are dried 40 at ambient temperature or, optionally, under a heater or dryer such as a sodium lamp before packing to avoid any moisture formation in final packed product. In one version, drying occurs for at least 30 minutes and drying reaches a moisture level of 12 percent or less. In order to achieve the 12 percent concentration, in one version the initial moisture concentration of the granule is at six percent or less. Throughout the process, demineralized water may be added as necessary to produce the final moisture concentration level.

Optionally, the granules may also be screened 50 after coating using a mesh screen to produce a desired uniform or maximum particle size.

After blending, drying, and optional screening, the granules may be transferred to a silo or other storage tank 60 for later packaging, processing, or use.

In accordance with the above preferred process, in one embodiment an exemplary crop nutrition granule includes microalgae with mycorrhiza in granular formulations comprising:

from about 0.5% to about 5.0% weight to weight (w/w) microalgae inoculants, and more preferably 2.2% to 3.2%, and even more preferably about 2.7% w/w;

from about 0.5% to about 5.0% w/w mycorrhiza inoculants, and more preferably 1.5% to 2.5%, and even more preferably about 2% w/w;

demineralized water to provide a moisture concentration of about twelve percent or less, and preferably greater than six percent;

carrier granules (such as natural clay granules, mineral-based granules, or other solid substrate such as extruded pellets of organic composition or granules of mineral or synthetic fertilizer) in the range of about 80% to about 90% w/w, and more preferably about 87% w/w, thereby making up the balance of the weight after the microalgae and mycorrhiza, plus demineralized water, after drying.

Application. Compositions of the present invention may be applied to any plant or plant propagation material that may benefit from improved growth including agricultural crops, annual grasses, trees, shrubs, ornamental flowers and the like. Compositions of the present invention may further be applied to any area where a plant will grow including soil, a plant root zone and a furrow. In a preferred embodiment, the granular mixtures of the present invention deliver about 80,000 mycorrhiza spores when applied at 4 kg per acre.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

We claim:

1. A method for producing crop nutrition granules, comprising:
    preparing a microalgae solution;
    preparing a mycorrhizae solution;
    applying the microalgae solution and the mycorrhizae solution to a plurality of carrier granules to create coated granules; and
    drying the plurality of coated granules,
    wherein, after drying, the plurality of coated granules are crop nutrition granules comprising 0.5% to 5.0% w/w microalgae, 0.5% to 5.0% w/w mycorrhizae, and 6% to 12% w/w moisture.

2. The method of claim 1, further comprising forming a coating solution by combining the microalgae solution and the mycorrhizae solution, and wherein the step of applying the microalgae solution and the mycorrhizae solution comprises coating the plurality of carrier granules with the coating solution.

3. The method of claim 2, wherein the step of preparing the microalgae solution further comprises preparing the microalgae solution to a neutral pH level.

4. The method of claim 3, wherein the step of preparing the mycorrhizae solution further comprises preparing the mycorrhizae solution to a neutral pH level.

5. The method of claim 4, wherein the step of preparing the microalgae solution further comprises preparing the microalgae solution to a pH level of between 6.0 to 6.5, and wherein the step of preparing the mycorrhizae solution further comprises preparing the mycorrhizae solution to a pH level of between 6.0 to 6.5.

6. The method of claim 3, wherein the step of preparing the microalgae solution further comprises preparing the microalgae solution to a pH level of between 6.0 to 6.5.

7. The method of claim 2, wherein the mycorrhizae comprises a mycorrhiza mixture including endomycorrhiza and ectomycorrhiza.

8. The method of claim 7, wherein the mycorrhiza mixture contains at least 95 percent endomycorrhiza content.

9. The method of claim 7, wherein the mycorrhiza mixture contains at least 97 percent endomycorrhiza content.

10. The method of claim 2, wherein, after drying, the plurality of coated crop nutrition granules comprise 0.5% to 5.0% w/w microalgae, 0.5% to 5.0% w/w mycorrhizae, 6% to 12% w/w moisture, and the balance in the plurality of carrier granules.

11. The method of claim 10, wherein, after drying, the plurality of coated crop nutrition granules comprise greater than 2.2% w/w microalgae and greater than 1.5% w/w mycorrhizae.

12. The method of claim 10, wherein, after drying, the plurality of coated crop nutrition granules comprise about 2.7% w/w microalgae and about 2.0% w/w mycorrhizae.

13. The method of claim 2, wherein the plurality of carrier granules are natural clay material.

14. The method of claim 1, wherein the carrier granules are mineral and/or clay-based.

15. The method of claim 1, wherein the carrier granules comprise bentonite.

16. The method of claim 1, wherein the carrier granules comprise zeolite.

17. A plurality of crop nutrition granules, comprising:
    a plurality of carrier granules, each of the plurality of carrier granules having a coating, the coating including microalgae and mycorrhizae,
    wherein the plurality of coated granules are crop nutrition granules comprising 0.5% to 9.0% w/w microalgae, 0.5% to 5.0% w/w mycorrhizae, and 6% to 12% w/w moisture.

18. The plurality of crop nutrition granules of claim 17, wherein the coating comprises a neutral pH level.

19. The plurality of crop nutrition granules of claim 18, wherein the coating further comprises a microalgae solution at a neutral pH level, in combination with a mycorrhizae solution at a neutral pH level.

20. The plurality of crop nutrition granules of claim 18, wherein the coating further comprises a microalgae solution at a pH level of between 6.0 to 6.5, in combination with a mycorrhizae solution at a pH level of between 6.0 to 6.5.

21. The plurality of crop nutrition granules of claim 17, wherein the mycorrhizae comprises a mycorrhiza mixture including endomycorrhiza and ectomycorrhiza.

22. The method of claim 21, wherein the mycorrhiza mixture contains at least 95 percent endomycorrhiza content.

23. The plurality of crop nutrition granules of claim 17, wherein the plurality of carrier granules are natural clay material.

24. The plurality of crop nutrition granules of claim 17, wherein the mycorrhiza mixture contains at least 97 percent endomycorrhiza content.

25. The plurality of crop nutrition granules of claim 17, wherein the plurality of coated crop nutrition granules comprise 0.5% to 5.0% w/w microalgae, 0.5% to 5.0% w/w mycorrhizae, 6% to 12% w/w moisture, and the balance in the plurality of carrier granules.

26. The plurality of crop nutrition granules of claim 17, wherein the carrier granules are mineral and/or clay-based.

27. The plurality of crop nutrition granules of claim 17, wherein the carrier granules comprise bentonite.

28. The plurality of crop nutrition granules of claim 17, wherein the carrier granules comprise zeolite.

* * * * *